(12) United States Patent
Iellimo

(10) Patent No.: US 10,526,140 B2
(45) Date of Patent: Jan. 7, 2020

(54) STRUCTURAL MEMBER CONNECTION HAVING IMPROVED STRUCTURAL SUPPORT

(71) Applicant: Frazier Industrial Company, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 15/345,736

(22) Filed: Nov. 8, 2016

(65) Prior Publication Data

US 2018/0127206 A1    May 10, 2018

(51) Int. Cl.
*B65G 1/02* (2006.01)

(52) U.S. Cl.
CPC ..................... *B65G 1/02* (2013.01)

(58) Field of Classification Search
CPC ......... B65G 1/02; A47B 96/06; A47B 47/027; A47B 57/402; A47B 57/48; A47B 57/50; A47B 57/32; A47B 57/44; E04B 2/789; E04C 2003/0421; E04C 2003/0473
USPC .................................................. 211/191, 192
See application file for complete search history.

(56) References Cited

U.S. PATENT DOCUMENTS

| | | | | |
|---|---|---|---|---|
| 2,925,920 A | * | 2/1960 | Skubic | A47B 57/402 108/107 |
| 3,009,582 A | * | 11/1961 | Degener | A47B 57/402 211/134 |
| 3,151,745 A | * | 10/1964 | Reilly | A47B 57/402 211/191 |
| 3,266,635 A | * | 8/1966 | McConnell | A47B 57/402 211/187 |
| 3,273,720 A | * | 9/1966 | Seiz | A47B 57/402 108/107 |
| 3,278,043 A | * | 10/1966 | Kimpton | A47B 57/402 211/191 |
| 3,392,848 A | * | 7/1968 | McConnell | A47B 57/50 211/192 |
| 3,606,027 A | * | 9/1971 | Clements | A47B 57/402 211/191 |
| 3,638,981 A | * | 2/1972 | Weider | F16B 7/00 211/192 |
| 3,642,146 A | * | 2/1972 | Frazier | A47B 57/48 211/192 |
| 3,879,144 A | * | 4/1975 | Eckerbrecht | A47B 57/402 211/191 |

(Continued)

*Primary Examiner* — Patrick D Hawn
(74) *Attorney, Agent, or Firm* — Dilworth & Barrese, LLP

(57) ABSTRACT

A support structure is disclosed that allows additional weight to be supported. The support structure includes a shelf beam that includes a horizontal beam and a vertical bar. The vertical bar attaches to a vertical column using a fastening mechanism. In addition, the vertical bar includes a channel that corresponds to a protrusion on the vertical column. When the shelf beam and the vertical column are fastened to each other, the protrusion of the vertical column mates with the channel of the vertical bar of the shelf beam. As a result of the protrusion and the channel mating with each other, weight or pressure that is exerted on the horizontal beam is transferred, absorbed and/or supported by the support structure, thereby allowing additional weight to be supported by the support structure.

16 Claims, 8 Drawing Sheets

(56) References Cited

U.S. PATENT DOCUMENTS

| | | | | |
|---|---|---|---|---|
| 3,999,875 A * | 12/1976 | Simon | A47B 57/30 | 211/189 |
| 4,023,683 A * | 5/1977 | Vargo | A47B 57/402 | 211/192 |
| 4,064,996 A * | 12/1977 | Shillum | A47B 57/402 | 108/107 |
| 4,067,445 A * | 1/1978 | Derclaye | A47B 57/402 | 211/191 |
| 4,189,250 A * | 2/1980 | Abbott | A47B 57/402 | 211/192 |
| 5,263,598 A * | 11/1993 | Vortherms | A47B 57/44 | 211/189 |
| 5,377,851 A * | 1/1995 | Asano | A47B 47/022 | 211/191 |
| 5,411,154 A * | 5/1995 | Vargo | F16B 12/30 | 211/189 |
| 5,584,399 A | 12/1996 | King | | |
| 5,797,233 A * | 8/1998 | Hascall | E04B 2/766 | 52/481.1 |
| 5,857,560 A * | 1/1999 | Bjorkholm | B29C 45/14565 | 198/816 |
| 6,374,558 B1 * | 4/2002 | Surowiecki | E04B 2/7457 | 52/241 |
| 7,191,908 B2 * | 3/2007 | De Rijk | A47B 57/32 | 211/187 |
| 7,832,171 B2 * | 11/2010 | Erickson | E04B 2/767 | 52/653.1 |
| 8,061,099 B2 * | 11/2011 | Andrews | E04B 2/7457 | 52/243.1 |
| 8,281,943 B2 | 10/2012 | Suman et al. | | |
| 9,282,820 B2 * | 3/2016 | Lo | A47F 5/01 | |
| 2001/0047975 A1 | 12/2001 | Lazas | B65G 1/02 | 211/183 |
| 2004/0079712 A1 * | 4/2004 | Mayer | A47B 57/485 | 211/26 |
| 2004/0200794 A1 * | 10/2004 | De Rijk | A47B 57/32 | 211/191 |
| 2006/0065614 A1 | 3/2006 | Lewis et al. | | |
| 2008/0193247 A1 | 8/2008 | Zupancich et al. | | |
| 2008/0237157 A1 | 10/2008 | Hanel | | |
| 2012/0267332 A1 * | 10/2012 | Mariani | A47B 47/027 | 211/206 |
| 2015/0189986 A1 | 7/2015 | Thrush et al. | | |

* cited by examiner

STRUCTURAL MEMBER CONNECTION HAVING IMPROVED STRUCTURAL SUPPORT

BACKGROUND

Storage racks are used by companies or individuals to hold goods or pallets of goods. Storage racks are often only as strong as the components that hold them together. For example, fastening mechanisms that connect and hold beams and shelving together may limit the amount of weight the storage rack can hold based on the strength of the nuts fastening mechanism used. In this regard, even if the beams and shelving are strong enough to hold significant amounts of weight, if the fastening mechanism are not equally as strong then the strength of the overall structure is reduced. However, the more weight a storage rack is able to hold can thereby reduce costs for a company by requiring less storage racks to be purchased and reducing the amount of real-estate needed.

SUMMARY

A support structure that implements a corresponding channel and protrusion that allow additional weight to be supported by the support structure is disclosed herein. A horizontal beam is attached to a vertical bar and the vertical bar fastens to a vertical column using any number of fastening mechanisms. The vertical bar also has a channel on an inner surface thereof that comes into contact with the vertical column. Additionally, the vertical column has a protrusion that mates with the channel of the vertical bar. In this regard, when weight, such as in the form of objects, are placed on the horizontal beam, a contact surface of the channel of the vertical bar directly contacts and creates frictional forces with a contact surface of the protrusion of the vertical column. Any weight on the horizontal beam is thus transferred, absorbed and/or supported by the vertical column as opposed to the fastening mechanism, thereby allowing the storage rack to hold more weight. For example, the weight and pressure exerted on the horizontal beam is no longer falling solely on the strength of the fastening mechanism that attach the horizontal beam to the vertical bar, but rather the channel transfers that weight onto the vertical column via the protrusion.

A support structure is disclosed herein, the support structure includes a horizontal beam having a first end; a vertical connector having an inner surface and an outer surface, the outer surface attached to the first end of the horizontal beam, the vertical connector having a cross-sectional L-shape including a first arm and a second arm and extending along a longitudinal axis of the vertical connector, the vertical connector defining a channel positioned on the inner surface along the longitudinal axis; and a vertical column including a protrusion on a surface thereof, the protrusion extending at least partially along a longitudinal axis of the vertical column, the protrusion being mateable with the channel of the vertical connector.

In addition, an apparatus is disclosed, the apparatus includes a vertical connector having an inner surface and an outer surface, a cross-sectional L-shape including a first arm and a second arm and extending along a longitudinal axis of the vertical connector, the vertical connector defining a channel positioned on the inner surface along the longitudinal axis, the channel positioned at or about a point of connection of the first arm and the second arm.

As a further embodiment, a support structure is disclosed herein, the support structure includes a vertical column including a protrusion on a surface thereof, the protrusion extending at least partially along a longitudinal axis of the vertical column.

BRIEF DESCRIPTION OF THE DRAWINGS

Like reference numerals indicate similar parts throughout the figures.

DETAILED DESCRIPTION

The present disclosure may be understood more readily by reference to the following detailed description of the disclosure taken in connection with the accompanying figures, which from a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value an to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
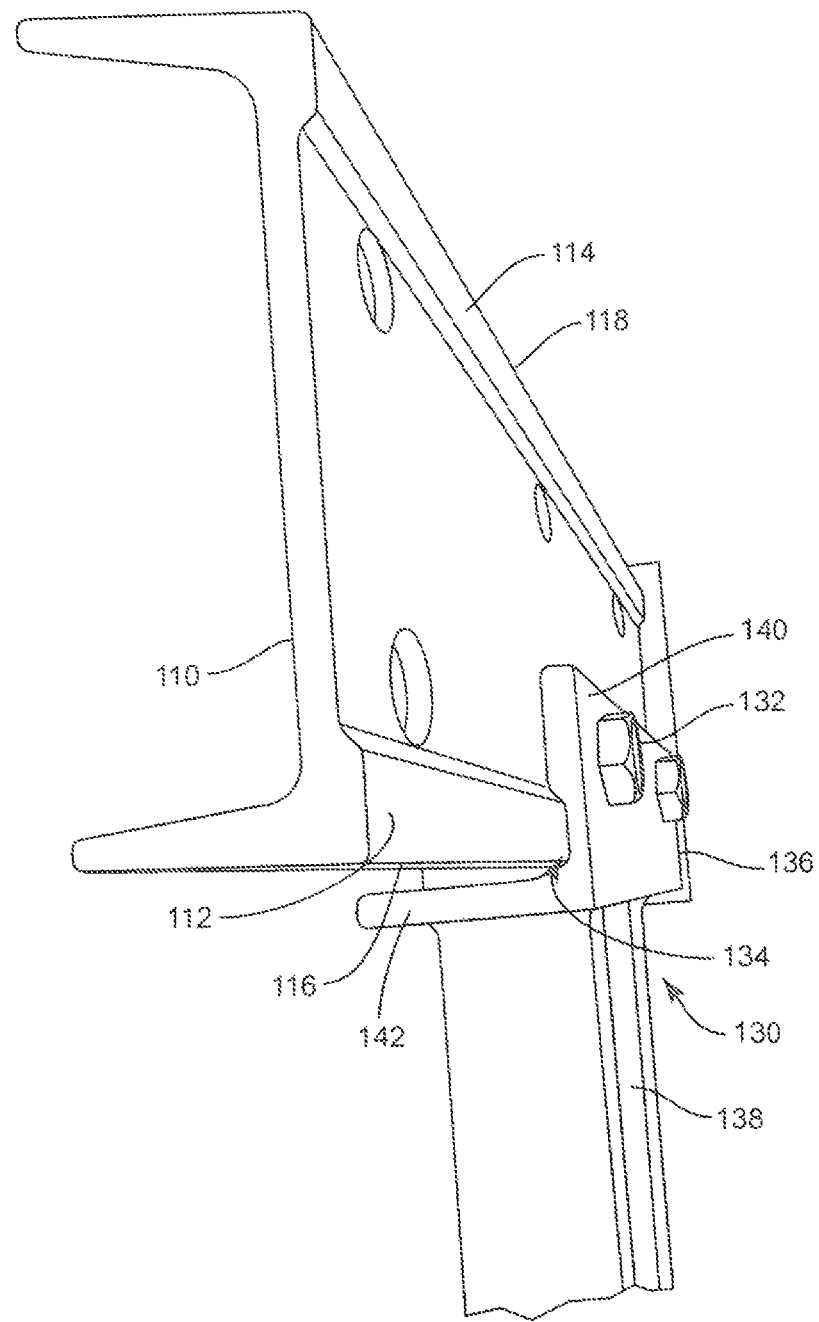
FIG. 1 depicts a horizontal beam and vertical bar fastened to a vertical column in accordance with aspects of the present disclosure.

FIG. 1 illustrates a portion of a support structure including vertical bar 136 of shelf beam 130 mated with vertical column 110 via a fastening mechanism, such as bolts 132. Although bolts 132 are depicted therein, it should be understood that other fastening mechanisms may attach shelf beam 130 to vertical column 110 as well, such as pins. In addition, horizontal beam 138 of shelf beam 130 is attached to an of vertical bar 136, and an inner surface of vertical bar 136 is positioned adjacent to vertical column 110. Vertical column 110 and shelf beam 130 may be made out of metal such as steel or any other type of metal to provide sufficient support for a support rack. Additionally, the material that vertical column 110 and shelf beam 130 are made out of may depend on the products to be stored thereon, such as stored on horizontal beam 138 of shelf beam 130. For example, if relatively light-weight materials are going to be stored on the storage rack, then the material of vertical column 110 and shelf beam 130 may be wood, plastic, etc. Alternatively, if heavy materials are to be stored on the storage rack, such as pallets in a warehouse scenario, then metal and types thereof may be used in order to provide adequate support.

Vertical bar 136 of shelf beam 130 fastens to vertical column 110 via a fastening mechanism. In this regard, vertical column 110 and vertical bar 136 include corresponding bores for bolts 132 to be inserted therethrough, in which case nuts 732 (see FIG. 7A) are threaded around bolts 132. As illustrated in FIG. 1, vertical bar 136 includes first arm 140 and second arm 142, in which case the first arm 140 of vertical bar 136 is fastened to vertical column 110. Additionally, vertical bar 136 may be connectable at multiple locations along vertical column 110. For example, the fastening mechanism may be removed and then re-attached once the position of vertical bar 136 is in a preferred location.

As illustrated in FIG. 1, vertical column 110 includes first protrusion 112 and second protrusion 114 located on a first end 116 and a second end 118 of vertical column 110, respectively. In addition, vertical bar 136 includes channel 134, which runs along a longitudinal axis of vertical bar 136. Channel 134 corresponds with first protrusion 112 when vertical bar 136 and vertical column 110 are connected or mated together. Although only shelf beam 130 connected to vertical column 110 is depicted in the figures, it should be understood that vertical column 110 is wide enough to allow a second shelf beam to be fastened to second end 118 of vertical column 110 as well.

Figure 2:
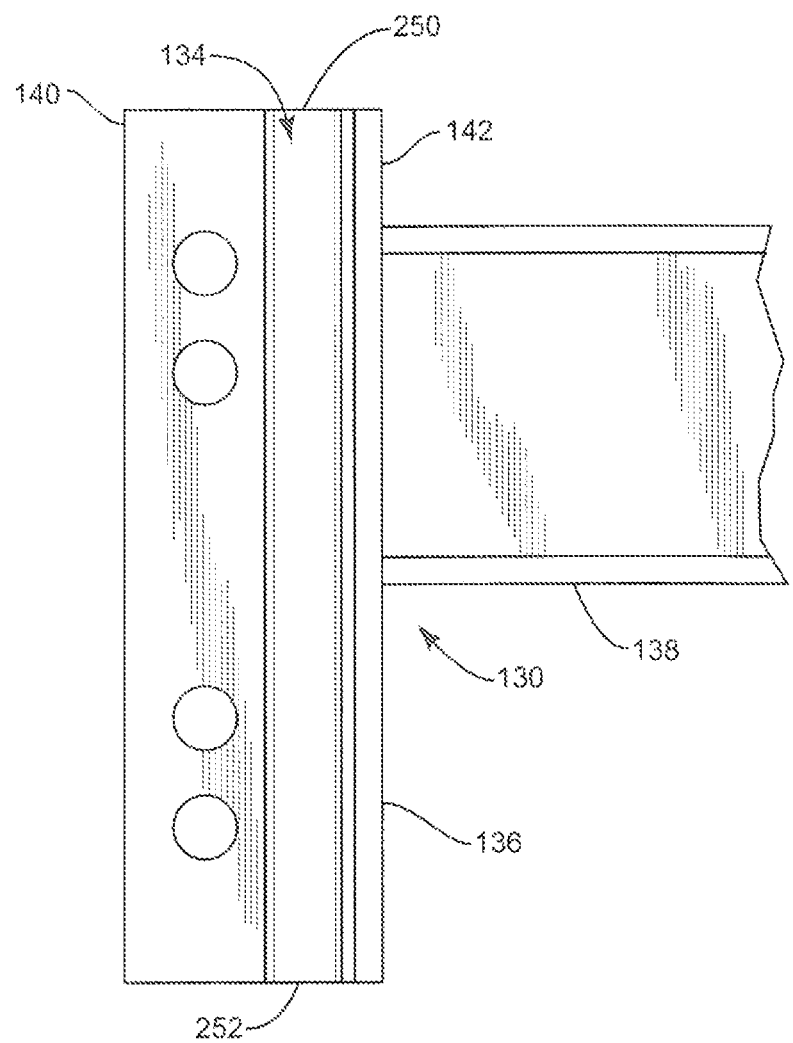
FIG. 2 illustrates a channel of the vertical bar in accordance with aspects of the present disclosure.
Figure 3:
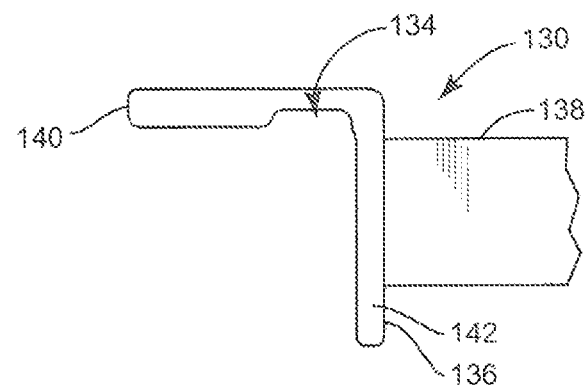
FIG. 3 illustrates the channel of the vertical bar in accordance with aspects of the present disclosure.

As shown in FIGS. 2 and 3, channel 134 is located on an inner surface of second arm 140 of vertical bar 136. In this regard, channel 134 is positioned adjacent to the point where first arm 140 and second arm 142 meet or otherwise come together. Put differently, channel 134 may be at or about the point where first arm 140 and second arm 142 meet or come together.

Figure 4:
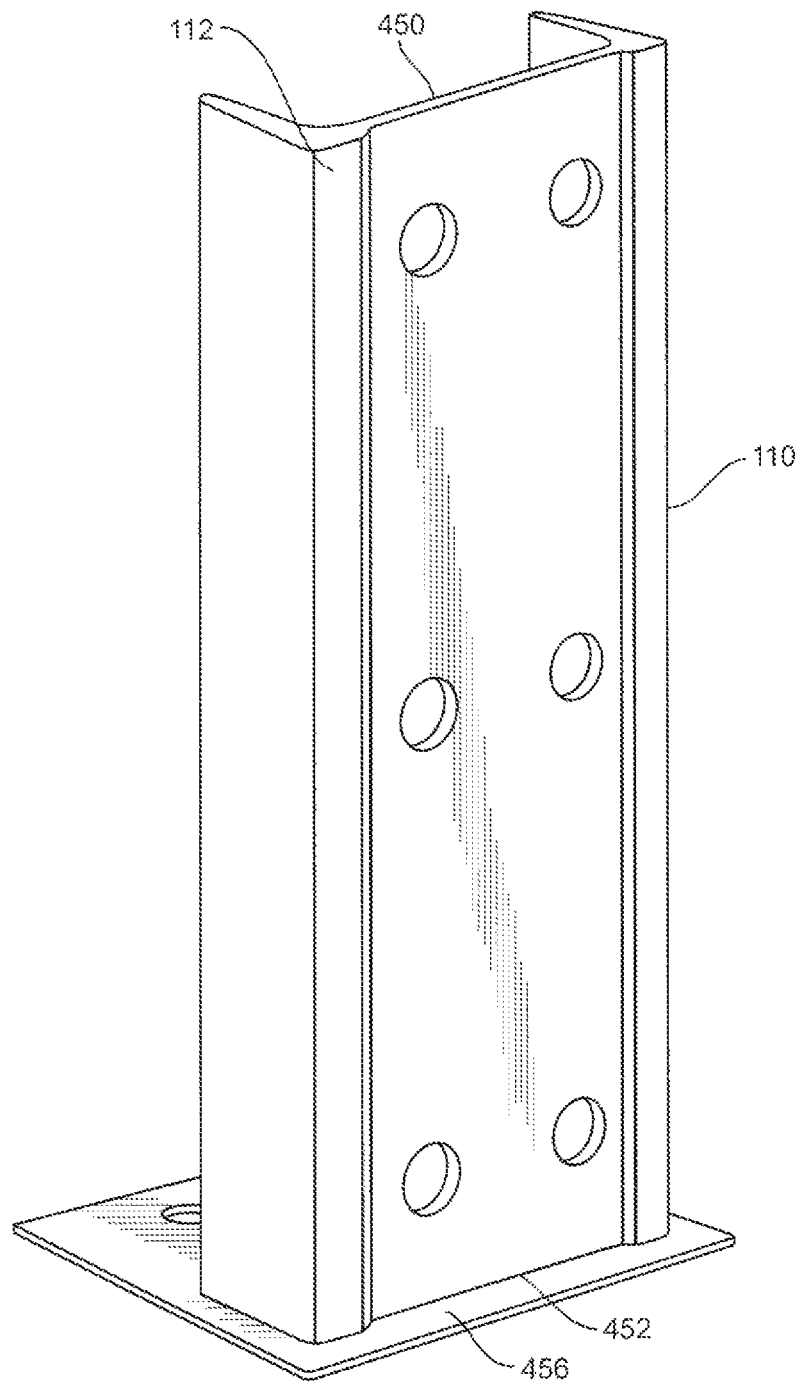
FIG. 4 is a perspective view of the vertical column in accordance with aspects of the present disclosure.
Figure 5:
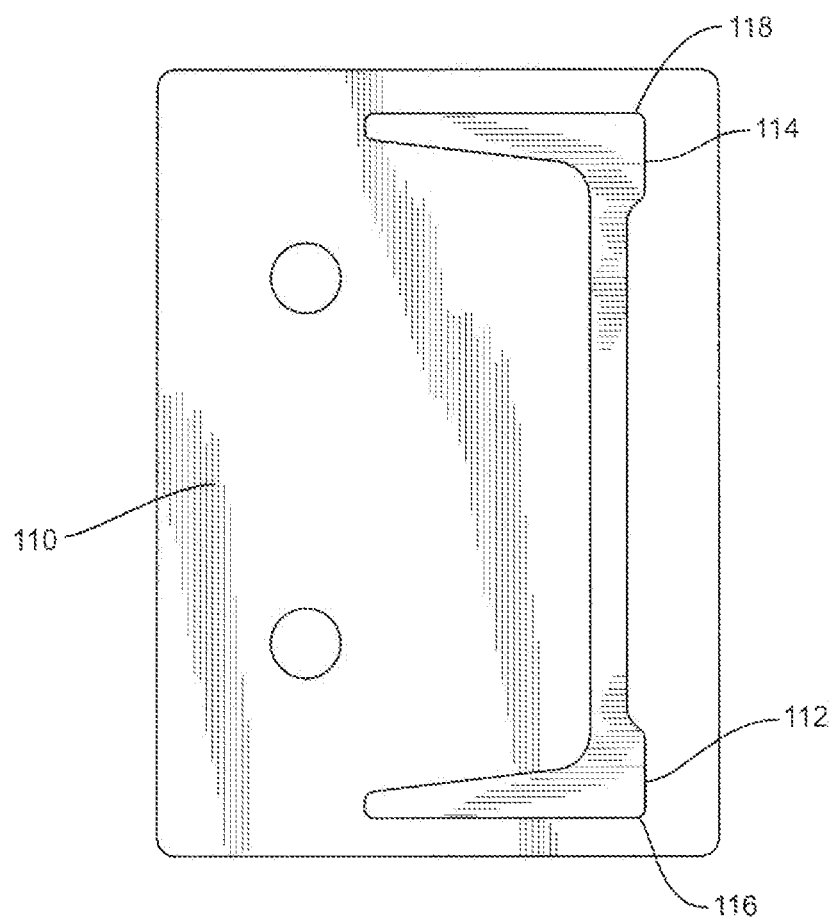
FIG. 5 illustrates the protrusion in accordance with aspects of the present disclosure.

Additionally, channel 134 of vertical bar 136 extends longitudinally along the entirety of vertical bar 136. Furthermore, FIGS. 4 and 5 illustrate first protrusion 112 and second protrusion 114 located on first end 116 and second end 118, respectively. First protrusion 112 and second protrusion 114 are located on an external side of vertical column 110. As illustrated, first protrusion 112 and second protrusion 114 extend along a substantial portion of vertical column 110. First protrusion 112 should correspond with channel 134, such that vertical column 110 and vertical bar 136 are ultimately capable of securely mating with each other. A second vertical bar may be attached to second protrusion 114 on vertical column 110 as well.

As another example, channel 134 may extend along a portion of vertical bar 136. For instance, channel 134 may extend only halfway along vertical bar 136. It should be understood that channel 134 may extend from any distance from first end 250 of vertical bar 136 to second end 252 of vertical bar 136, the second end being opposite the first end. Additionally, channel 134 may not start or end at first end 250 or second end 252 of vertical bar 136, but rather may be positioned at any point between the two ends.

As a further example, vertical bar 136 may include a plurality of channels on portions of vertical bar 136. For example, there may be a channel on an upper portion of vertical bar 136, lower portion and/or mid-portion. The plurality of channels may be dispersed at any one or more locations between the first end 250 and second end 252 of vertical bar 136.

Similarly, first protrusion 112 and second protrusion 114 may entirely extend along vertical column 110 or extend along a portion of vertical column 110. For instance, the protrusion may extend only halfway along vertical column 110. Additionally or alternatively, the protrusion may extend any distance from first end 450 of vertical column 110 to second end 452 of vertical column 110, the second end 452 being opposite the first end 450, and second end 452 resting on base 456. As another example, the protrusion may not start or end at first end 450 or second end 452 of vertical column 110, but rather may be positioned at any point between the first end 450 and second end 452.

As further example, vertical column 110 may include a plurality of protrusions thereon. For example, there may be a protrusion on an upper portion of vertical column 110, a lower portion, and/or a mid-portion. The plurality of protrusions may be dispersed at any one or more locations between the first end 450 and second end 452 of vertical column 110.

As discussed above, first protrusion 112 should correspond with channel 134. Therefore, any design or implementation of one or more protrusions on vertical column 110 should correspond with one or more channels on vertical bar 136, such that the one or more protrusions can securely mate with the one or more channels.

Figure 6:
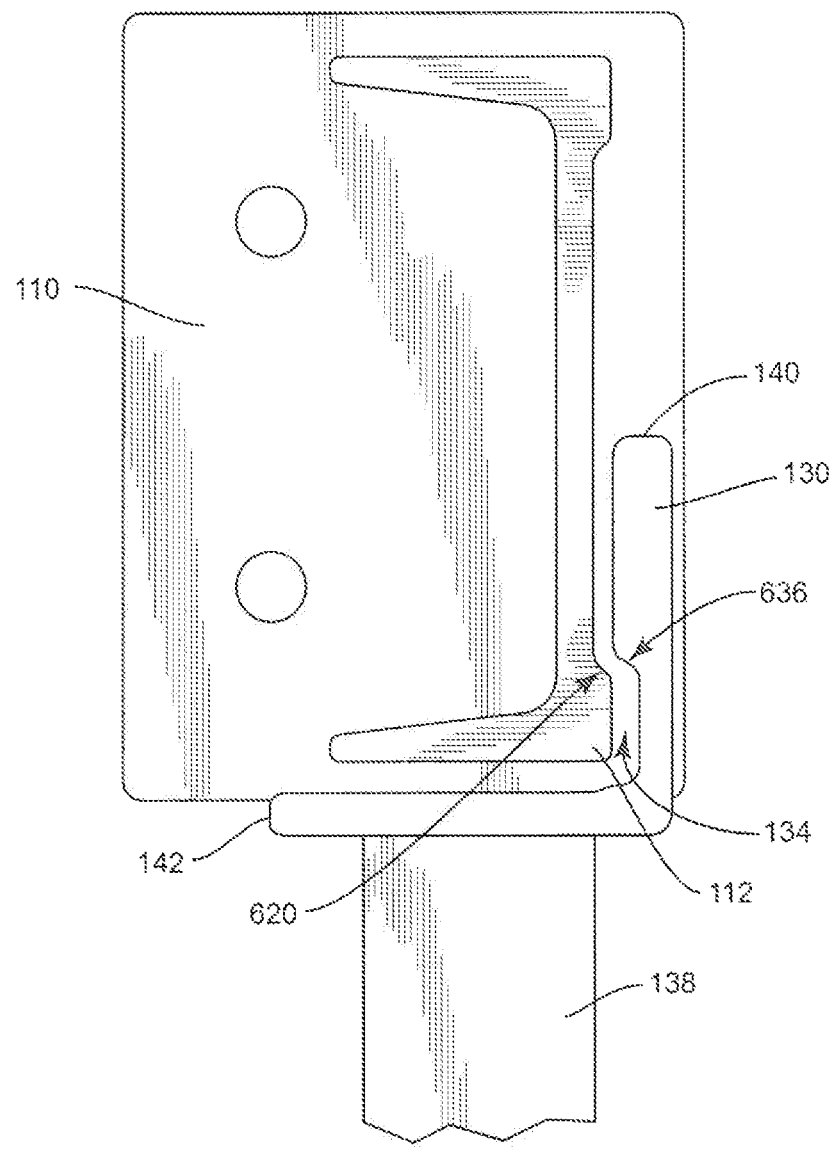
FIG. 6 illustrates the protrusion corresponding with the channel in accordance with aspects of the present disclosure.

FIG. 6 shows how channel 134 and first protrusion 112 correspond and mate with each other. In this regard, FIG. 6 illustrates that the size and shape of channel 134 correlate with the size and shape of first protrusion 112. Vertical bar 136 and vertical column 110 are designed such that the two pieces, when fastened to each other, form into a single solid structure, thereby creating additional support. For example, channel end 636 of channel 134 comes into direct contact with protruding end 620 of vertical column 110 when the two pieces are fastened to each other. This connection between channel 134 and protrusion 112 provides greater strength to the support structure by shelf beam 130 and vertical column 110 forming an integral unit by being in direct contact with each other, rather than the strength of the connection depending on the fastening mechanism.

Figure 7A:
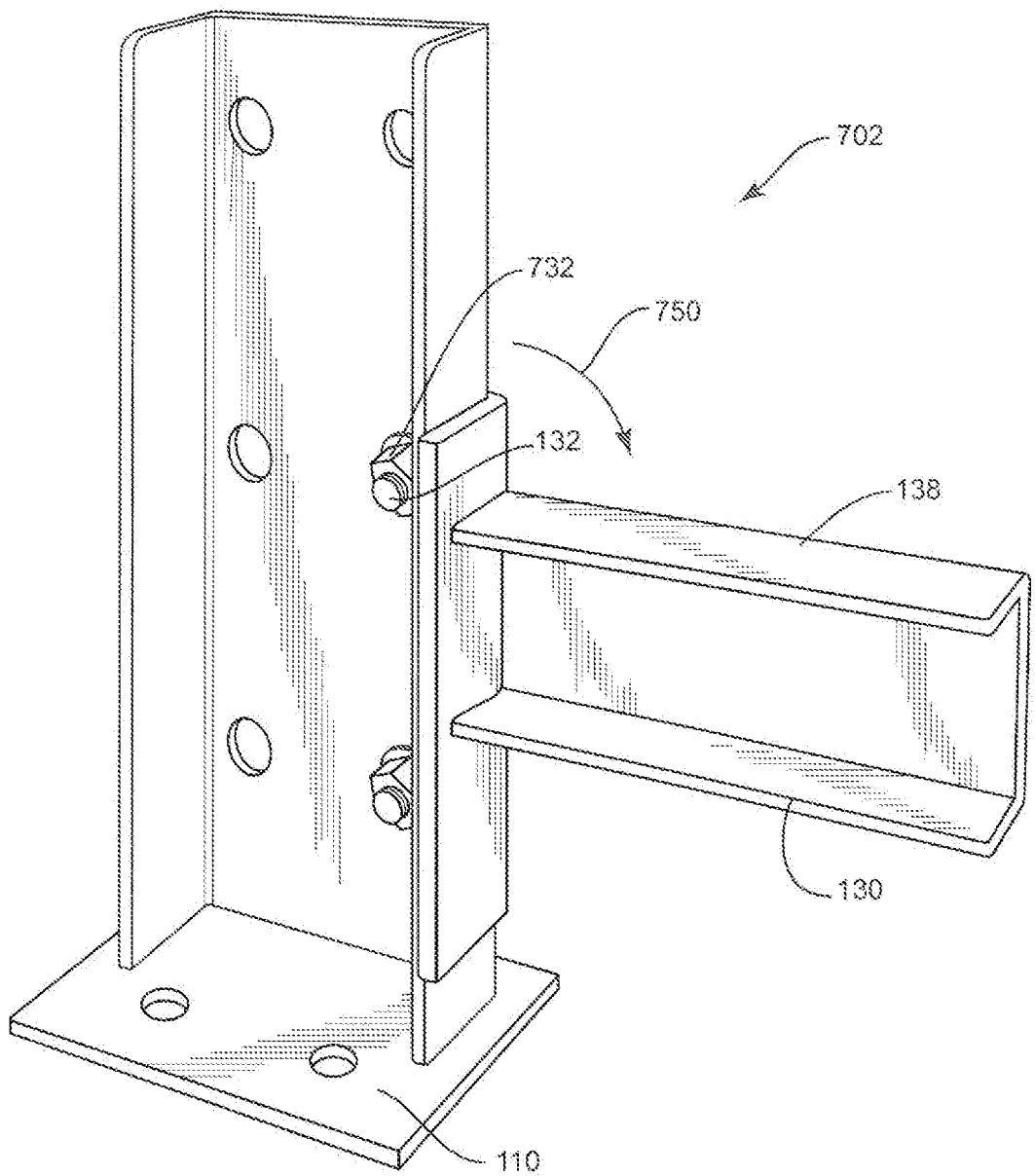
FIGS. 7A-B illustrate the assembled horizontal beam and vertical bar with the vertical column in accordance with aspects of the present disclosure.
Figure 7B:
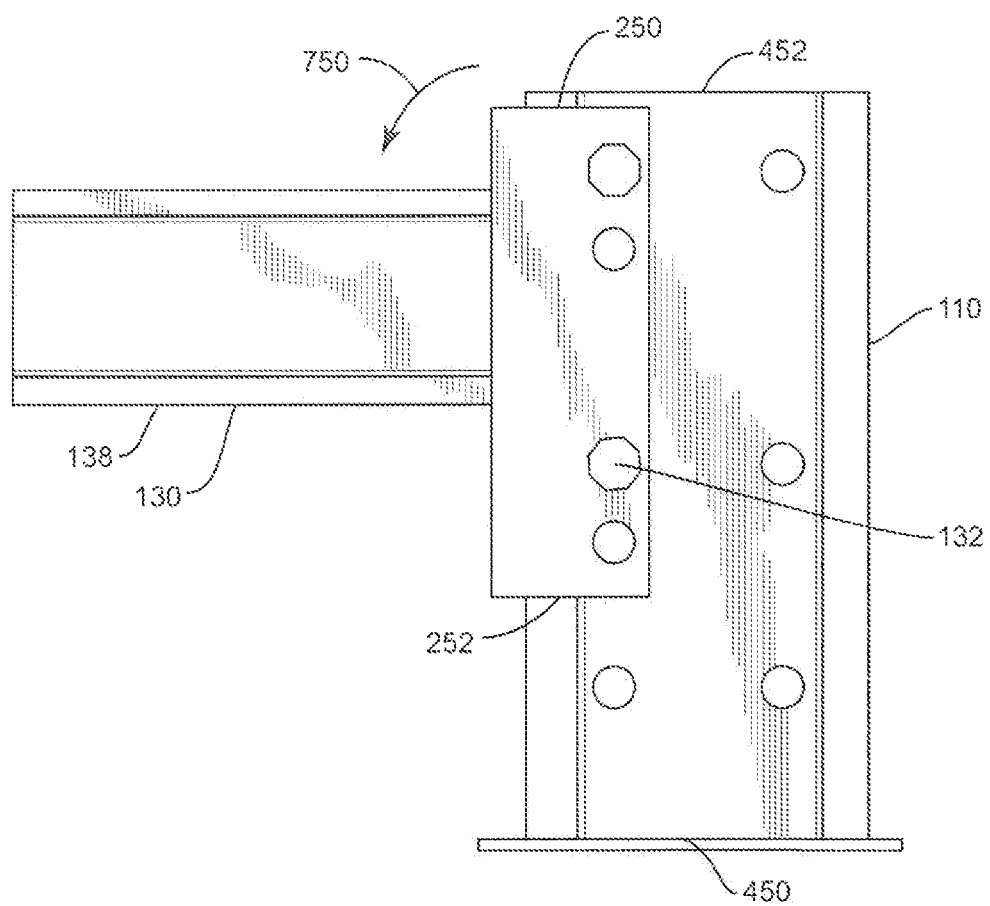

For example and as illustrated in FIGS. 7A-B, a single integral structure is formed when shelf beam 130 and vertical column 110 are fastened to each other. When weight or pressure is exerted on horizontal beam 138, such as when one or more pallets are stored thereon, the connection provides for at least some transference of weight onto vertical column 110. Thus, vertical column 110 provides additional support to the weight exerted on shelf beam 130. Instead of the weight and pressure being transferred and exerted against the fastening mechanism, the pressure is instead at least partially absorbed by vertical column 110 via first protrusion 112, thereby allowing vertical column 110 and shelf beam 130 to work in sync to hold up weight. In particular, because channel end 636 and protruding end 620 essentially latch onto each other and form essentially an integral structure, more weight is able to be handled by the storage rack.

For example, if first protrusion 112 and channel 134 were not present, then the weight and pressure expressed in the direction of arrow 750 would be exerted essentially and solely on the fastening mechanism. Therefore, the strength of the overall storage rack may depend on the strength of the fastening mechanism. As a result of the formation of first protrusion 112 and channel 134, however, the weight and pressure expressed in the direction of arrow 750 is now being transferred, absorbed and/or supported by the entire vertical column 110 as well via protrusion 112. Since vertical column 110 is generally constructed and designed to support more weight than the fastening mechanism, the entire storage rack is capable of holding additional weight. This is because the storage rack is no longer held back by how much weight is supported by the fastening mechanism.

Figure 8:
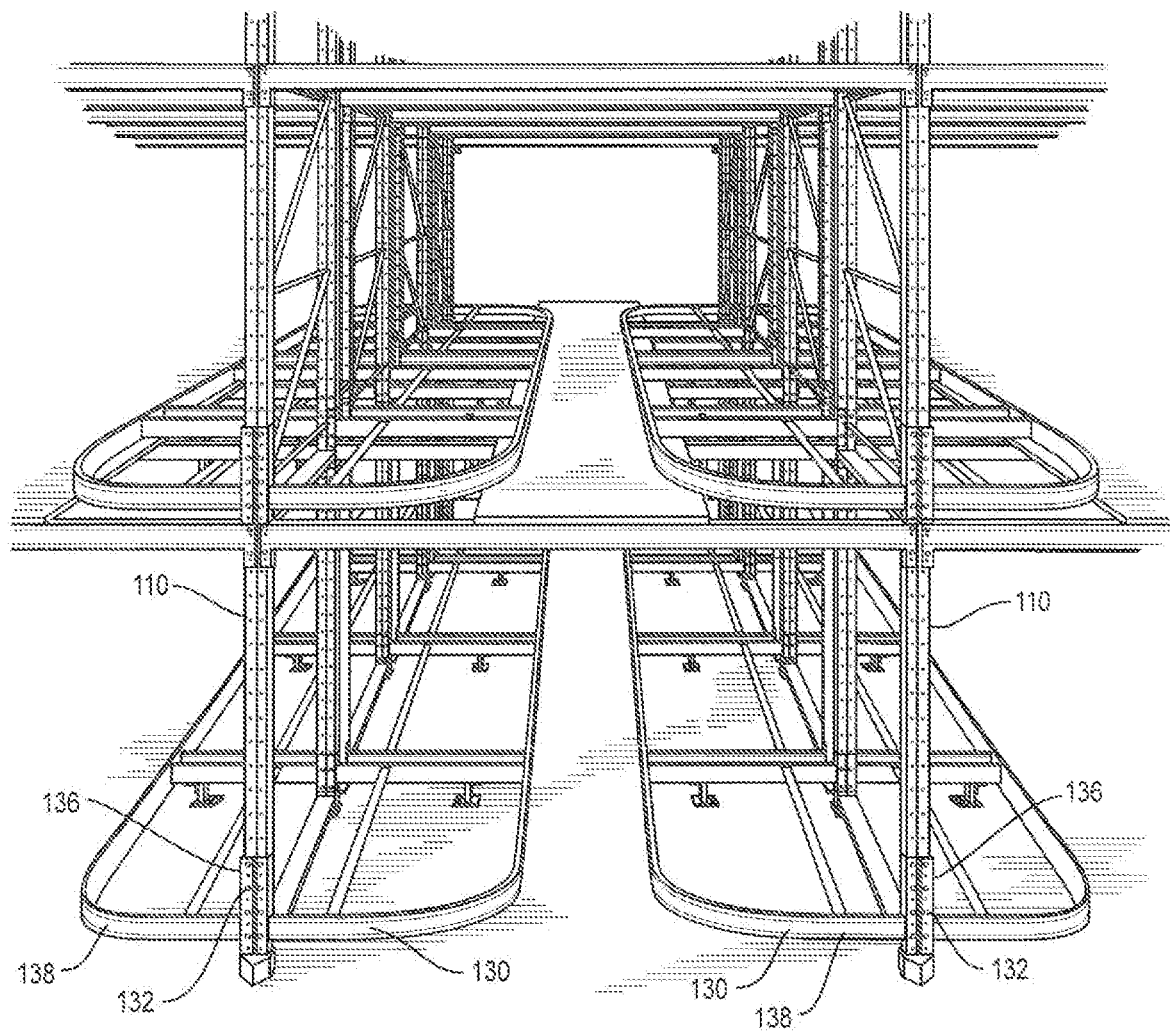
FIG. 8 illustrates an assembled storage rack with the horizontal bar, the vertical bar and the vertical column in accordance with aspects of the present disclosure.

FIG. 8 illustrates an example of the storage rack when fully assembled. For instance, vertical column 110 extends longitudinally up from the ground or base and is connected to vertical bar 136 of shelf beam 130. In addition, horizontal beam 138 of shelf beam 130 extends parallel to the ground in order to receive goods, such as in the of one or more pallets. Although FIG. 8 shows shelf beam 130 at a bottom portion of vertical column 110, it should be understood that shelf beam 130 may be attached to vertical column 110 at any location on vertical column 110. As illustrated in FIG. 8, the present disclosure may be implemented on a first level and/or it can be implemented on a second level or any number of levels. Even further and as shown in FIG. 8, the system disclosed herein may be implemented along multiple locations about a storage rack, and should not be construed as being implemented in any particular location. For instance and with reference to FIG. 8, the connection disclosed herein between vertical column 110 and shelf beam 130 may occur between any of the horizontal members and vertical members illustrated in FIG. 8, such as on an end of the storage rack, at any middle connection piece, and along any location on the second level. Therefore, the connection disclosed herein may be positioned at any location between a horizontal member and a vertical column.

The foregoing is advantageous by allowing the storage rack to hold additional weight and therefore more goods or products. This occurs because the supportable weight by the storage rack is not restricted to the fastening mechanism employed, but rather the actual storage rack structure itself. This saves costs by allowing companies, such as in a warehouse, to need less amounts of storage racks since additional weight can be held by a single storage rack by implementing aspects of the present disclosure. In addition, repair costs may be reduced by less fastening mechanisms being able to break as a result of excess weight being exerted against the fastening mechanism. In this regard, safety is also increased because the overall storage racks are less prone to collapse due to the fastening mechanism breaking, such as snapping in half.

While the above description contains many specifics, these specifics should not be construed as limitations of the invention, but merely as exemplifications of preferred embodiments thereof. Those skilled in the art will envision many other embodiments within the scope and, spirit of the invention as defined by the claims appended hereto.

The invention claimed is:

1. A support structure, comprising:
a horizontal beam having a first end and defining a first direction extending from the first end, along a longitudinal axis of the horizontal beam;
a vertical connector having an inner surface and an outer surface, the outer surface attached to the first end of the horizontal beam, the vertical connector having a cross-sectional L-shape including a first arm connected to a second arm at a junction, the first arm extending from the junction in the first direction and having a cross sectional thickness smaller than the distance the first arm extends from the junction, the first arm having a near end near the junction and a far end farther from the junction than is the near end, the first arm and the second arm extending along a longitudinal axis of the vertical connector in a second direction, perpendicular to the first direction, the second arm extending from the junction in a third direction that is perpendicular to the first direction and the second direction,
the vertical connector defining a concave channel positioned in the inner surface and formed into the thickness of the first arm, the channel extending in the second direction along the near end of the first arm;
a vertical column having a vertical longitudinal axis extending in the second direction and a first edge, a second edge and a connecting wall having a front side facing the first arm and an opposite rear side, the connecting wall extending in the first direction between the first edge and the second edge, the first edge and the second edge extending in the third direction from the rear side of the connecting wall, the vertical column including a convex protrusion protruding from the front side of the connecting wall, having a longitudinal axis and extending in the second direction, the protrusion located where the connecting wall meets the first edge,
the protrusion being nestable in the channel in the vertical connector with the far end of the first arm extending past the protrusion, and attached to the connecting wall with the protrusion and channel between the far end of the first arm and the horizontal beam, the far end of the first arm pressed in the third direction against the front side of the connecting wall,
the far end of the first arm provided with a plurality of bolt receiving holes and the far end of the first arm attached to the connecting wall with at least two bolts extending through the connecting wall in the third direction.

2. The support structure of claim 1, wherein the second arm is positioned against the first edge and extends farther below the horizontal beam than it extends above the horizontal beam.

3. The support structure of claim 1 wherein, the vertical connector is connectable along multiple locations along the longitudinal axis of the vertical column and the vertical connector consists essentially of the first arm connected to the second arm and the vertical column consists essentially of the first edge, the second edge and the connecting wall therebetween, the connecting wall is substantially flat, the first second edges extend in the third direction from the rear side of the connecting wall and the protrusion is on the front side of the connecting wall, opposite the first edge.

4. The support structure of claim 1, wherein the connecting wall of the vertical column is perpendicular to the longitudinal axis of the vertical column and is one of three inches, three-and-a-half inches or four inches.

5. The support structure of claim 1, further comprising:
a second vertical connector having an inner surface and an outer surface, the outer surface of the second vertical connector attached to a second end of the horizontal beam, the second vertical connector having a cross-sectional L-shape including a first arm and a second arm and extending along the longitudinal axis of the second vertical connector, the second vertical connector defining a concave channel positioned in the inner surface thereof along the longitudinal axis; and
a second vertical column including a convex protrusion on a surface thereof, the protrusion extending at least partially along a longitudinal axis of the second vertical column, the protrusion being mateable with the channel of the vertical connector.

6. The support structure of claim 1, wherein;
the channel extends from a first end of the vertical connector to a second end of the vertical connector, the first end is opposite the second end; and
the protrusion extends from a first end of the vertical column to a second end of the vertical column, the first end is opposite the second end.

7. The support structure of claim 1, wherein:
the channel has outer edges at the inner surface and a bottom portion recessed from the inner surface into the cross sectional thickness of the first arm, the channel extending along the longitudinal axis, the channel positioned on the first arm at a point of connection of the first arm and the second arm with an overlapping portion of the first arm extending past the channel, farther from the point of connection, the overlapping portion including the at least one hole for receiving a bolt and the first arm extends a distance from the point of connection greater than the cross sectional thickness of the first arm.

8. The support structure of claim 7, wherein:
the channel extends from at or about a first end of the vertical connector to at or about a second end of the vertical connector, the first end is opposite the second end; and
the protrusion extends from at or about a first end of the vertical column to at or about a second end of the vertical column, the first end is opposite the second end.

9. The support structure of claim 8, wherein the vertical connector is connectable along multiple locations of the longitudinal axis of the vertical column.

10. The support structure of claim 1, wherein the channel of the vertical connector is adjacent the junction where the first arm is joined to the second arm and includes a flap portion extending farther from the junction than the channel is from the junction, the channel and flap connectable to the vertical column along multiple locations of the longitudinal axis of the vertical column.

11. The support structure of claim 10, wherein:
the channel extends from adjacent a first end of the vertical connector to adjacent a second end of the vertical connector, the first end is opposite the second end; and
the protrusion extends from at or about a first end of the vertical column to at or about a second end of the vertical column, the first end is opposite the second end.

12. The support structure claim 10, wherein:
the horizontal beam has a second end opposite the first end, and the second end is connected to a second vertical connector;
the second vertical connector having an inner surface and an outer surface, the outer surface of the second vertical connector attached to the second end of the horizontal beam, the second vertical connector having a cross-sectional L-shape including a first arm and a second arm and extending along the longitudinal axis of the vertical connector, the second vertical connector defining a channel positioned on the inner surface along the longitudinal axis;
a second vertical column including a protrusion on a surface thereof, the protrusion extending at least partially along a longitudinal axis of the second vertical column, the protrusion being mateable with the channel of the vertical connector.

13. The support structure of claim 10, wherein a length of the vertical column perpendicular to the longitudinal axis of the vertical column is one of three inches, three-and-a-half inches or four inches.

14. The support structure of claim 1, wherein the first arm, second arm and channel of the vertical connector form a torque resistance means for resisting torque when the horizontal beam receives a load.

15. The apparatus of claim 7, wherein the first arm, second arm and channel of the vertical connector form a torque resistance means for resisting torque when the horizontal beam receives a load.

16. The support structure of claim 10, wherein the connecting wall and protrusion form a torque resistance means for resisting torque when the horizontal beam receives a load.

* * * * *